United States Patent
Nussbaum

(10) Patent No.: US 11,937,666 B2
(45) Date of Patent: Mar. 26, 2024

(54) LACE ADJUSTER

(71) Applicant: LACECLIP LLC, Miami Beach, FL (US)

(72) Inventor: Jonathan Nussbaum, Miami, FL (US)

(73) Assignee: LACECLIP LLC, Miami Beach, FL (US)

( * ) Notice: Subject to any disclaimer, the term of this patent is extended or adjusted under 35 U.S.C. 154(b) by 153 days.

(21) Appl. No.: 17/354,655

(22) Filed: Jun. 22, 2021

(65) Prior Publication Data

US 2021/0315315 A1 Oct. 14, 2021

Related U.S. Application Data

(63) Continuation-in-part of application No. 16/690,908, filed on Nov. 21, 2019, now Pat. No. 11,659,885, (Continued)

(51) Int. Cl.
*A43B 3/34* (2022.01)
*A43C 1/06* (2006.01)
(Continued)

(52) U.S. Cl.
CPC ............ *A43B 3/34* (2022.01); *A43C 1/06* (2013.01); *A43C 7/00* (2013.01); *A43C 7/08* (2013.01);
(Continued)

(58) Field of Classification Search
CPC .... A43B 3/34; A43C 1/06; A43C 7/00; A43C 7/08; A45F 5/02; A45F 2005/023; G01P 15/18; G03B 29/00
See application file for complete search history.

(56) References Cited

U.S. PATENT DOCUMENTS 1,879,475 A * 9/1932 Poon ................. A43C 7/08
24/712.9
4,622,723 A * 11/1986 Krauss ................. F16G 11/101
24/136 R
(Continued)

FOREIGN PATENT DOCUMENTS

CN 101185535 A1 5/2008
CN 101367011 A 2/2009
(Continued)

OTHER PUBLICATIONS

International Search Report and Written Opinion, issued by European Patent Office, in Application No. PCT/2021/038485, dated Oct. 12, 2021. (Related matter).
(Continued)

*Primary Examiner* — Victor D Batson
*Assistant Examiner* — Matthew J Sullivan
(74) *Attorney, Agent, or Firm* — ROEDER & BRODER LLP; Steven G. Roeder

(57) ABSTRACT

A lace adjuster for selectively adjusting and securing a shoelace of a shoe, the shoelace including a first lace end and a second lace end, includes an adjuster body, and a lace end retainer. The lace end retainer is coupled to the adjuster body. The lace end retainer is configured to receive and retain the first lace end and/or the second lace end between the lace end retainer and a surface of the adjuster body. The first lace end and/or the second lace end of the shoelace is thus inhibited from being moved relative to the lace end retainer and the adjuster body when retained by the lace end retainer by a force generated by a contact pressure of the lace end retainer against the surface of the adjuster body. The lace end retainer can be formed from a resilient material.

19 Claims, 9 Drawing Sheets

Related U.S. Application Data which is a continuation of application No. 15/301,946, filed as application No. PCT/US2015/025763 on Apr. 14, 2015, now Pat. No. 10,595,581.

(60) Provisional application No. 62/043,822, filed on Aug. 29, 2014, provisional application No. 62/018,194, filed on Jun. 27, 2014, provisional application No. 61/979,491, filed on Apr. 14, 2014.

(51) Int. Cl.
| | |
|---|---|
| A43C 7/00 | (2006.01) |
| A43C 7/08 | (2006.01) |
| A45F 5/02 | (2006.01) |
| G01P 15/18 | (2013.01) |
| G03B 29/00 | (2021.01) |

(52) U.S. Cl.
CPC ............... *A45F 5/02* (2013.01); *G01P 15/18* (2013.01); *G03B 29/00* (2013.01); *A45F 2005/023* (2013.01)

(56) References Cited

U.S. PATENT DOCUMENTS

| | | | |
|---|---|---|---|
| 5,029,371 A | 7/1991 | Rosenblood | |
| 5,345,657 A * | 9/1994 | Shimizu | F16G 11/101 24/136 L |
| 5,649,340 A * | 7/1997 | Ida | F16G 11/101 24/136 R |
| 7,596,891 B2 * | 10/2009 | Carnes | A43B 3/34 36/25 R |
| 7,722,219 B2 * | 5/2010 | Hartley | A43C 7/00 362/253 |
| 8,181,320 B2 * | 5/2012 | Wolfberg | A43C 7/00 36/50.1 |
| 8,231,506 B2 | 7/2012 | Molyneaux | |
| 8,360,904 B2 | 1/2013 | Oleson | |
| D689,495 S | 9/2013 | Bentley et al. | |
| D694,842 S | 12/2013 | Bentley et al. | |
| 8,613,676 B2 | 12/2013 | Bentley | |
| 8,700,354 B1 | 4/2014 | Bentley et al. | |
| 8,702,430 B2 | 4/2014 | Dibenedetto | |
| 8,702,516 B2 | 4/2014 | Bentley et al. | |
| D706,654 S | 6/2014 | Bentley et al. | |
| 8,827,824 B2 | 9/2014 | Bentley et al. | |
| 8,903,521 B2 | 12/2014 | Goree et al. | |
| 8,904,605 B2 * | 12/2014 | Kawaguchi | F16G 11/03 D8/383 |
| 8,905,855 B2 | 12/2014 | Fitzpatrick et al. | |
| 8,913,134 B2 | 12/2014 | Goree et al. | |
| 8,941,723 B2 | 1/2015 | Bentley et al. | |
| 8,944,928 B2 | 2/2015 | Kaps et al. | |
| 8,994,826 B2 | 3/2015 | Bentley | |
| 9,017,296 B2 * | 4/2015 | Beck | A61M 39/28 604/249 |
| 9,028,337 B2 | 5/2015 | Bentley | |
| 9,039,527 B2 | 5/2015 | Bentley et al. | |
| 9,928,878 B2 | 3/2018 | Anderson | |
| 10,238,166 B2 | 3/2019 | Rosenbaum | |
| 10,409,961 B2 | 9/2019 | Flaherty | |
| 10,512,304 B2 * | 12/2019 | Nussbaum | A43C 7/08 |
| 10,595,581 B2 * | 3/2020 | Nussbaum | A43C 7/08 |
| 11,510,462 B2 * | 11/2022 | Yun | A43C 1/02 |
| 2002/0152645 A1 | 10/2002 | Darley et al. | |
| 2004/0221433 A1 * | 11/2004 | Wolfberg | A43B 3/0078 24/712.5 |
| 2005/0268436 A1 * | 12/2005 | Yoshiguchi | F16G 11/101 24/115 G |
| 2007/0166024 A1 | 7/2007 | Robinson | |
| 2008/0115334 A1 * | 5/2008 | Chen | A43C 7/00 24/115 G |
| 2009/0223085 A1 | 9/2009 | Wolfberg | |
| 2009/0293313 A1 | 12/2009 | Bruce et al. | |
| 2011/0016680 A1 * | 1/2011 | Chang | A43C 7/00 24/712.5 |
| 2011/0178720 A1 | 7/2011 | Bamburg et al. | |
| 2011/0251822 A1 | 10/2011 | Darley et al. | |
| 2012/0088544 A1 | 4/2012 | Bentley et al. | |
| 2012/0215474 A1 | 8/2012 | Bentley et al. | |
| 2013/0008058 A1 * | 1/2013 | Jasmine | A43B 3/34 36/136 |
| 2013/0095941 A1 | 4/2013 | Bentley et al. | |
| 2013/0117975 A1 | 5/2013 | Herrera | |
| 2013/0128022 A1 | 5/2013 | Bose et al. | |
| 2013/0211774 A1 | 8/2013 | Bentley et al. | |
| 2014/0085465 A1 | 3/2014 | Angermann et al. | |
| 2014/0376876 A1 | 12/2014 | Bentley et al. | |
| 2015/0059136 A1 * | 3/2015 | Schreiner | A43C 7/00 24/712.3 |
| 2015/0154452 A1 | 6/2015 | Bentley et al. | |
| 2017/0241797 A1 | 8/2017 | Kong | |
| 2021/0012877 A1 | 1/2021 | Aragones | |
| 2021/0014582 A1 | 1/2021 | Case, Jr. | |

FOREIGN PATENT DOCUMENTS

| | | |
|---|---|---|
| JP | 2009050699 A | 3/2009 |
| JP | 2014504943 A | 2/2014 |
| KR | 20010065023 A | 7/2001 |
| WO | WO2013010171 A1 | 1/2013 |
| WO | WO2013184672 A2 | 12/2013 |
| WO | WO2014036374 A1 | 3/2014 |
| WO | WO2015191157 | 12/2015 |

OTHER PUBLICATIONS

The International Search Report and Written Opinion of the International Searching Authority, dated Jul. 20, 2015, FlyClip LLC, PCT/US15/25763. (related application).

The International Preliminary Report on Patentability, dated Oct. 18, 2016, FlyClip LLC, PCT/US15/25763. (related application).

"Beyond Fitbit: Sensors track hang time, vertical leaps", San Diego Union Tribune Newspaper Article by Mike Freeman dated Jun. 17, 2015, pp. 1-3.

Supplementary European Search Report from the European Patent Office, Application Serial No. 15806231, dated Oct. 16, 2017. (related application).

Office Action dated Feb. 17, 2018 by the State Intellectual Property Office of China in Application No. 2015800318712. (related application). (A summary of portions of this Office Action is provided.).

Office Action dated Oct. 17, 2018 by the State Intellectual Property Office of China in Application No. 2015800318712. (related application).

Office Action dated Oct. 15, 2018 by the European Patent Office in Application No. 15806231.5. (related application).

Response to Office Action filed on Feb. 14, 2019 with the European Patent Office in Application No. 15806231.5. (related application).

Office Action dated Mar. 4, 2019 by the Australian Intellectual Property Office in Application No. 2015272024. (related application).

Office Action dated Mar. 26, 2019 by the Japan Patent Office in Application No. 2016-562003. (related application).

Office Action dated Oct. 29, 2019 by the Japan Patent Office in Application No. 2016-562003. (related application).

First Office Action issued by the Canadian Intellectual Property Office dated Apr. 1, 2020, in Canadian Patent Application No. 2,945,792. (related application).

Office Action from the State Intellectual Office—China, in Application No. 2015800318712, dated Apr. 1, 2021. (related application). (A summary of portions of this Office Action is provided.).

Office Action issued by the China Intellectual Property Administration, dated Nov. 30, 2022, in Chinese Patent Application No. 2021111964284. (Related matter). Informal summary in English provided by foreign associate.

Notification Concerning Transmittal of International Preliminary Report on Patentability issued by the International Bureau dated

(56) References Cited

OTHER PUBLICATIONS

Jan. 5, 2023, in PCT patent application serial No. PCT/US2021/038485. (Related matter).

* cited by examiner

LACE ADJUSTER

RELATED APPLICATIONS

This application is related to and claims priority on U.S. Provisional Application Ser. No. 63/042,401 filed on Jun. 22, 2020, and entitled "LACE ADJUSTER". To the extent permissible, the contents of U.S. Provisional Application Ser. No. 63/042,401 are incorporated in their entirety herein by reference.

Additionally, this application is also a continuation-in-part application of U.S. application Ser. No. 16/690,908 filed on Nov. 21, 2019, and entitled "LACE ADJUSTER ASSEMBLY INCLUDING FEEDBACK ASSEMBLY FOR USE IN VISULATIZING AND MEASURING ATHLETIC PERFORMANCE", which is a continuation of U.S. patent application Ser. No. 15/301,946 (now U.S. Pat. No. 10,595,581 B2 issued on Mar. 24, 2020), and entitled "LACE ADJUSTER ASSEMBLY INCLUDING FEEDBACK ASSEMBLY FOR USE IN VISULATIZING AND MEASURING ATHLETIC PERFORMANCE". U.S. patent application Ser. No. 15/301,946 is a 371 of PCT/US2015/025763 filed on Apr. 14, 2015, and entitled "LACE ADJUSTER ASSEMBLY INCLUDING FEEDBACK ASSEMBLY FOR USE IN VISULATIZING AND MEASURING ATHLETIC PERFORMANCE". PCT Application Serial No: PCT/US2015/025763 is related to and claims priority on (i) U.S. Provisional Application Ser. No. 61/979,491 filed on Apr. 14, 2014, and entitled "LACE ADJUSTER"; (ii) U.S. Provisional Application Ser. No. 62/018,194 filed on Jun. 27, 2014, and entitled "SENSOR ASSEMBLY FOR USE IN MEASURING ATHLETIC PERFORMANCE"; and (iii) U.S. Provisional Application Ser. No. 62/043,822 filed on Aug. 29, 2014, and entitled "IMAGE ASSEMBLY AND SENSOR ASSEMBLY FOR USE IN VISUALIZING AND MEASURING ATHLETIC PERFORMANCE". To the extent permissible, the contents of (i) U.S. application Ser. No. 16/690,908, (ii) U.S. patent application Ser. No. 15/301,946 (now U.S. Pat. No. 10,595,581 B2), (iii) PCT Application Serial No: PCT/US2015/025763, and (iv) U.S. Provisional Application Ser. Nos. 61/979,491, 62/018,194, and 62/043,822 are incorporated in their entirety herein by reference.

BACKGROUND

It is often necessary to adjust, tighten, and untighten (or loosen) the shoelaces of a shoe. Additionally, it is further desired to inhibit the shoelaces from being a potential tripping hazard for the person wearing the shoes. This can be especially true for an athlete during an athletic performance, as problems with shoelaces being untied, too tight, or too loose, and/or becoming tripping hazards, can lead to sub-optimal performance and/or injury.

SUMMARY

The present invention is directed to a lace adjuster for selectively adjusting and securing a shoelace of a shoe, the shoelace including a first lace end and a second lace end. In various embodiments, the lace adjuster includes an adjuster body, and a lace end retainer. The lace end retainer is coupled to the adjuster body. The lace end retainer is configured to receive and retain the first lace end between the lace end retainer and a surface of the adjuster body.

In some embodiments, the first lace end of the shoelace is inhibited from being moved relative to the lace end retainer and the adjuster body when retained by the lace end retainer by a force generated by a contact pressure of the lace end retainer against the surface of the adjuster body.

Additionally, in certain embodiments, the lace end retainer is further configured to receive and retain the second lace end between the lace end retainer and the surface of the adjuster body. In some such embodiments, the second lace end of the shoelace is similarly inhibited from being moved relative to the lace end retainer and the adjuster body when retained by the lace end retainer by the force generated by the contact pressure of the lace end retainer against the surface of the adjuster body.

The lace end retainer can be coupled to the adjuster body in any suitable manner. In certain embodiments, the lace end retainer includes a first coupling member and the adjuster body includes a second coupling member. In such embodiments, the first coupling member engages the second coupling member so that the lace end retainer is coupled to the adjuster body. Additionally, in some such embodiments, the lace end retainer includes a retainer body; the first coupling member is a coupling aperture that extends through the retainer body; the second coupling member is a coupling projection that extends away from the adjuster body; and the coupling aperture is positioned to engage the coupling projection so that the lace end retainer is coupled to the adjuster body.

In some embodiments, the lace end retainer is fixedly coupled to the adjuster body. Alternatively, in other embodiments, the lace end retainer is removably coupled to the adjuster body.

Further, in certain embodiments, the lace end retainer extends partially around the adjuster body when the lace end retainer is coupled to the adjuster body. Alternatively, in other embodiments, the lace end retainer extends fully around the adjuster body when the lace end retainer is coupled to the adjuster body.

In some embodiments, the lace end retainer is formed from a resilient material that is stretched when coupled to the adjuster body so as to exert a force onto the surface of the adjuster body based on a contact pressure between the lace end retainer and the adjuster body.

Additionally, in certain embodiments, the lace end retainer includes a retainer body and a retainer aperture that extends through the retainer body. In some such embodiments, the first lace end extends through the retainer aperture before being retained between the lace end retainer and the adjuster body.

In some embodiments, the lace adjuster further includes a motion restrictor that is coupled to and cantilevers away from the adjuster body, at least a portion of the motion restrictor being configured to be positioned between the shoelace and the shoe body when the lace adjuster is being used to selectively adjust and secure the shoelace of the shoe.

In one embodiment, the lace adjuster further includes a GPS sensor that is coupled to the adjuster body, the GPS sensor being configured to provide locational information of a user of the lace adjuster.

Further, the present invention is also directed toward a shoe including a shoe body and a shoelace that is coupled to the shoe body; and wherein a lace adjuster such as described herein above is selectively coupled to the shoelace.

Additionally, in other applications, the present invention is directed toward a method for selectively adjusting and securing a shoelace of a shoe, the shoelace including a first lace end and a second lace end, the method comprising the steps of: coupling a lace end retainer to an adjuster body; and receiving and retaining the first lace end between the lace end retainer and a surface of the adjuster body.

Further, the present invention is further directed toward (i) a method of providing a shoe including the steps of coupling a shoelace to a shoe body; and selectively adjusting and securing the shoelace utilizing the method described above; and (ii) a method for providing locational information of a user including the steps of providing an athletic field including at least one GPS beacon, the user wearing a shoe provided by the method as described above, and wherein the step of selectively adjusting and securing includes coupling a GPS sensor to the adjuster body.

Still further, the present invention is also directed toward a lace adjuster for selectively adjusting and securing a shoelace of a shoe, the shoelace being coupled to a shoe body of the shoe, the shoelace including a first lace end and a second lace end, the lace adjuster including an adjuster body that is configured to be selectively coupled to the shoelace of the shoe; and a motion restrictor that is coupled to and cantilevers away from the adjuster body, at least a portion of the motion restrictor being configured to be positioned between the shoelace and the shoe body when the lace adjuster is being used to selectively adjust and secure the shoelace of the shoe.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2B is a front perspective view of the lace adjuster illustrated in FIG. 2A, the lace adjuster being shown in an unlocked configuration;

DESCRIPTION

Figure 1:
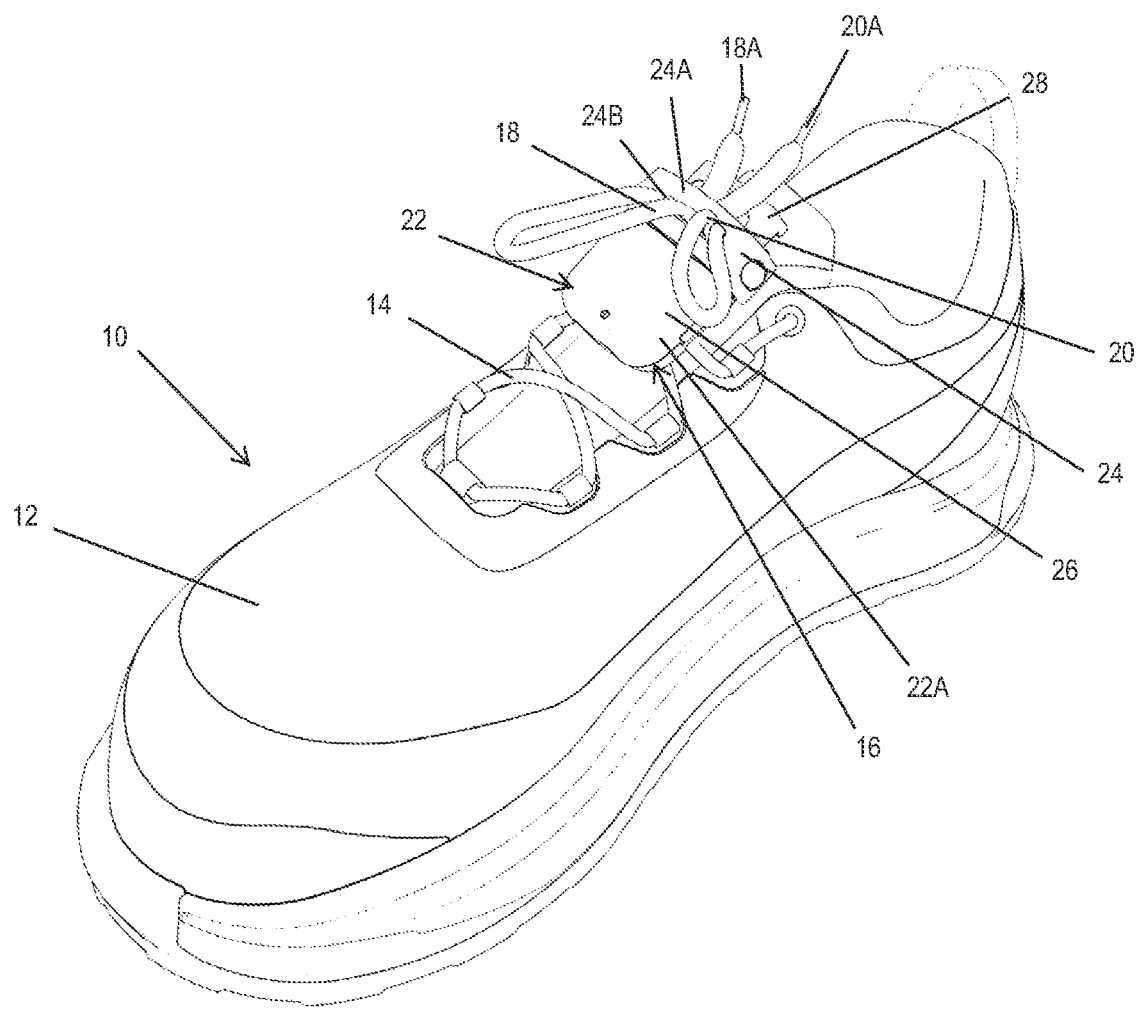
FIG. 1 is a perspective view of a shoe including a shoe body and a shoelace, and an embodiment of a lace adjuster having features of the present invention that is selectively coupled to the shoelace.

FIG. 1 is a perspective view of a shoe 10 including a shoe body 12 and a shoelace 14 that is coupled to the shoe body 12, and a lace adjuster 16 having features of the present invention that is selectively coupled to the shoelace 14 of the shoe 10. The shoe 10, including the shoe body 12 and the shoelace 14, can have any suitable design, shape and/or size to meet the specific desires and requirements of the user. As illustrated in FIG. 1, the shoe 10 can be an athletic-type shoe that can be used by a user for running, walking, engaging in any of various athletic performances, or for any other chosen activity. Alternatively, the shoe 10 can be another type of shoe. Additionally, as shown in FIG. 1, the shoelace 14 includes a first lace end 18 having a first end tip 18A, and an opposed second lace end 20 having a second end tip 20A.

As described in detail herein, the lace adjuster 16 can have any suitable design for purposes of enabling the user to quickly and easily adjust, tighten or loosen the shoelace 14 of the shoe 10. For example, in certain non-exclusive alternative embodiments, the lace adjuster 16 can be designed to include various features and limitations such as described in U.S. Pat. No. 8,181,320 B2 issued on May 22, 2012, and entitled "LACE ADJUSTER", U.S. Pat. No. 10,512,304 B2 issued on Dec. 24, 2019, and entitled "LACE ADJUSTER WITH INTERCHANGEABLE COVERS", and/or U.S. Pat. No. 10,595,581 B2 issued on Mar. 24, 2020, and entitled "LACE ADJUSTER ASSEMBLY INCLUDING FEEDBACK ASSEMBLY FOR USE IN VISUALIZING AND MEASURING ATHLETIC PERFORMANCE". As far as permitted, the contents of U.S. Pat. No. 8,181,320 B2, U.S. Pat. No. 10,512,304 B2, and U.S. Pat. No. 10,595,581 B2 are incorporated in their entireties herein by reference.

As shown in the embodiment illustrated in FIG. 1, the lace adjuster 16 can include an adjuster body 22 that is configured to be selectively coupled to the shoelace 14 of the shoe 10, and a lace end retainer 24 that is coupled to the adjuster body 22. Additionally, in certain embodiments, the adjuster body 22 can include a first body member 26 and a second body member 28 that are movable relative to one another between an unlocked configuration wherein the lace adjuster 16 can effectively receive the first lace end 18 and/or the second lace end 20 of the shoelace 14, and a locked configuration wherein the lace adjuster 16 retains the first lace end 18 and/or the second lace end 20 so that the lace adjuster 16 is fixed in position and/or is inhibited from moving relative to the shoelace 14. Alternatively, the lace adjuster 16 can include more components or fewer components than those specifically illustrated in FIG. 1.

As an overview, and as described in greater detail herein below, the lace adjuster 16 is configured to be selectively coupled to the shoelace 14 when it is desired to quickly and easily adjust, tighten and/or loosen the shoelace 14 relative to the shoe body 12. Additionally, the lace end retainer 24 is configured to selectively receive and securely retain the first lace end 18, e.g., at or near the first end tip 18A, and/or the second lace end 20, e.g., at or near the second end tip 20A, to inhibit the shoelace 14 from being a potential tripping hazard for the user or wearer of the shoe 10.

As noted above, the lace end retainer 24 is coupled to the adjuster body 22, e.g., to one of the first body member 26 and the second body member 28. Additionally, as provided herein, the lace end retainer 24 is configured to receive and securely retain the first lace end 18, e.g., at or near the first end tip 18A, and/or the second lace end 20, e.g., at or near the second end tip 20A, between the lace end retainer 24 and the adjuster body 22. More particularly, in certain embodiments, the lace end retainer 24 is configured such that the first lace end 18 and/or the second lace end 20 are inhibited from being moved relative to the lace end retainer 24 and the adjuster body 22 when retained by the lace end retainer 24 by a force generated by a contact pressure of the lace end retainer 24 against a surface 22A of the adjuster body 22. Stated in another manner, in such embodiments, the first lace end 18 and/or the second lace end 20 are inhibited from being moved relative to the lace end retainer 24 and the adjuster body 22 when retained by the lace end retainer 24 by effectively pinching the first lace end 18 and/or the second lace end 20 between the lace end retainer 24 and the surface 22A of the adjuster body 22.

As described herein, the lace end retainer 24 can be coupled to the adjuster body 22 in any suitable manner. For example, in one embodiment, the lace end retainer 24 is fixedly coupled to the adjuster body 22. Alternatively, in another embodiment, the lace end retainer 24 is removably coupled to the adjuster body 22.

Additionally, in some embodiments, the lace end retainer 24 can be configured such that the lace end retainer 24 extends partially around the adjuster body 22 when the lace end retainer 24 is coupled to the adjuster body 22. Alternatively, in other embodiments, the lace end retainer 24 can be configured such that the lace end retainer 24 extends fully around the adjuster body 22 when the lace end retainer 24 is coupled to the adjuster body 22.

Further, the lace end retainer 24 can be formed from any suitable materials. For example, in some embodiments, the lace end retainer 24 is formed from a resilient material, e.g., rubber or another suitable elastic or resilient material. In such embodiments, the lace end retainer 24 can be stretched at least slightly when the lace end retainer 24 is coupled to the adjuster body 22. With such design, based on the resilient nature of the lace end retainer 24, the lace end retainer 24 is better able to exert a force onto the surface 22A of the adjuster body 22 based on a contact pressure between the lace end retainer 24 and the surface 22A of the adjuster body 22. Thus, the lace end retainer 24 is better able to pinch the first lace end 18 and/or the second lace end 20 between the lace end retainer 24 and the surface 22A of the adjuster body 22. Alternatively, the lace end retainer 24 can be formed from another suitable material.

Additionally, the lace end retainer 24 can have any suitable design for purposes of effectively receiving and retaining the first lace end 18 and/or the second lace end 20 between the lace end retainer 24 and the adjuster body 22.

In certain embodiments, such as shown in FIG. 1, the lace end retainer 24 can include a retainer body 24A and a retainer aperture 24B that extends through the retainer body 24A.

It is appreciated that the first lace end 18 and/or the second lace end 20 can be retained between the lace end retainer 24 and the adjuster body 22 in any suitable manner and can be oriented in any suitable direction. In some such embodiments, the first lace end 18 and/or the second lace end 20 can extend through the retainer aperture 24B as the lace adjuster 16 is being initially coupled to the shoelace 14. Additionally, in one such embodiment, the first lace end 18 and/or the second lace end 20 can again extend through the retainer aperture 24B before being retained between the lace end retainer 24 and the adjuster body 22. Alternatively, in another such embodiment, the first lace end 18 and/or the second lace end 20 can be positioned so as to extend fully under the retainer body 24A (i.e. and not back through the retainer aperture 24B) before being retained between the lace end retainer 24 and the adjuster body 22. Still alternatively, in still another such embodiment, the first lace end 18 and/or the second lace end 20 can extend and be retained between the lace end retainer 24 and the adjuster body 22 before the lace end 18, 20 extends in a generally outward direction through the retainer aperture 24B. It is appreciated that in any of such embodiments, the lace ends 18, 20 can extend between the lace end retainer 24 and the adjuster body 22 near or toward the top of the lace adjuster 16, near or toward the bottom of the lace adjuster 16, or near or toward both the top and the bottom of the lace adjuster 16.

Alternatively, in other such embodiments, the lace end retainer 24 can be positioned such that the first lace end 18 and/or the second lace end 20 do not extend through the retainer aperture 24B as the lace adjuster 16 is being initially coupled to the shoelace 14. In such alternative embodiments, the first lace end 18 and/or the second lace end 20 can extend through the retainer aperture 24B before being retained between the lace end retainer 24 and the adjuster body 22, the first lace end 18 and/or the second lace end 20 can be positioned so as to extend fully under the retainer body 24A (i.e. and not through the retainer aperture 24B) while being retained between the lace end retainer 24 and the adjuster body 22, or the first lace end 18 and/or the second lace end 20 can extend between the retainer body 24A and the adjuster body 22 before extending outwardly through the retainer aperture 24B.

Still alternatively, the lace end retainer 24 can be designed without the retainer aperture 24B, and the first lace end 18 and/or the second lace end 20 can be positioned so as to extend at least partially, if not fully under the retainer body 24A while being retained between the lace end retainer 24 and the adjuster body 22.

Figure 2A:
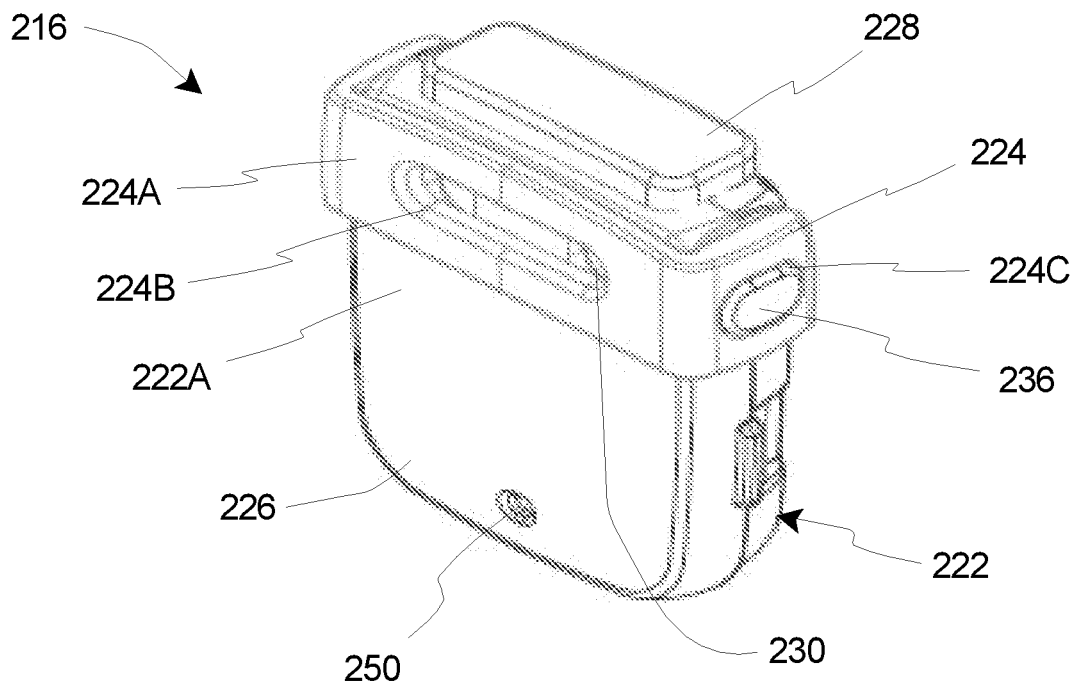
FIG. 2A is a front perspective view of an embodiment of the lace adjuster, the lace adjuster being shown in an unlocked configuration.

FIG. 2A is a front perspective view of an embodiment of the lace adjuster 216. In some embodiments, the lace adjuster 216 can be lightweight and water-resistant so that it is comfortable for the user and usable in various environments.

As noted above, the design of the lace adjuster 216 can be varied for purposes of enabling the user to quickly and easily adjust, tighten or loosen the shoelace 14 (illustrated in FIG. 1) of the shoe 10 (illustrated in FIG. 1). Additionally, the lace adjuster 216 can be further configured to inhibit the shoelace 14 from becoming a potential tripping hazard for the user or wearer of the shoe 10. In the embodiment illustrated in FIG. 2A, the lace adjuster 216 includes an adjuster body 222 including a first body member 226 and a second body member 228, and a lace end retainer 224 that is coupled to the adjuster body 222.

Additionally, as provided herein above, in certain embodiments, the adjuster body 222, i.e. the first body member 226 and the second body member 228, is movable between an unlocked configuration wherein the lace adjuster 216 can effectively receive the first lace end 18 (illustrated in FIG. 1) and/or the second lace end 20 (illustrated in FIG. 1) of the shoelace 14, and a locked configuration wherein the lace adjuster 216 retains the first lace end 18 and/or the second lace end 20 so that the lace adjuster 216 is fixed in position and/or is inhibited from moving relative to the shoelace 14. For example, in certain embodiments, the adjuster body 222 can be configured such that the second body member 228 moves relative to the first body member 226 is a plunger-like manner as the adjuster body 222 is being moved between the unlocked configuration and the locked configuration. FIG. 2A illustrates the lace adjuster 216 in the unlocked configuration.

It is appreciated that when the lace adjuster 216 is coupled to the shoelace 14, the shoelace 14 is adjustable relative to the adjuster body 222 when the adjuster body 222 is in the unlocked configuration, and the shoelace 14 is inhibited from being adjusted relative to the adjuster body 222 when the adjuster body 222 is in the locked configuration.

Figure 2B:
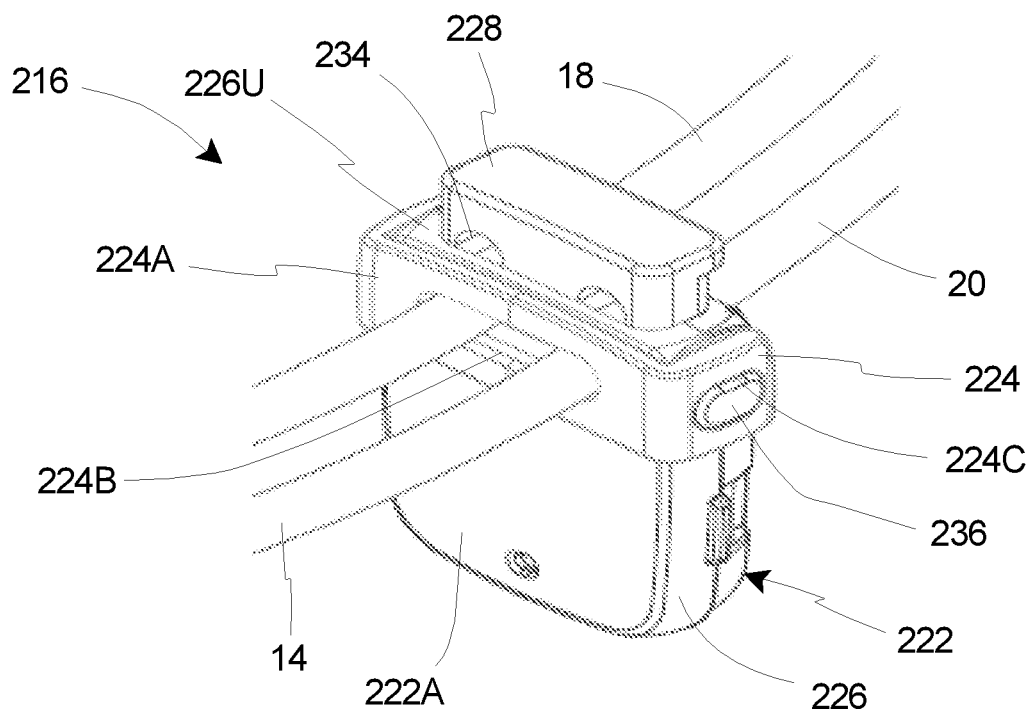
FIG. 2B is a front perspective view of a portion of the shoelace, and the lace adjuster illustrated in FIG. 2A, the lace adjuster being shown in a locked configuration.

FIG. 2B is a front perspective view of a portion of the shoelace 14 (i.e. a portion of the first lace end 18 and the second lace end 20), and the lace adjuster 216 illustrated in FIG. 2A. As shown in FIG. 2B, the lace adjuster 216 is in the locked configuration. More specifically, the second body member 228 has been moved relative to the first body member 226 such that the first lace end 18 and the second lace end 20 of the shoelace 14 can be effectively retained by the adjuster body 222, i.e. such that movement of the shoelace 14 is inhibited relative to the adjuster body 222.

Figure 2C:
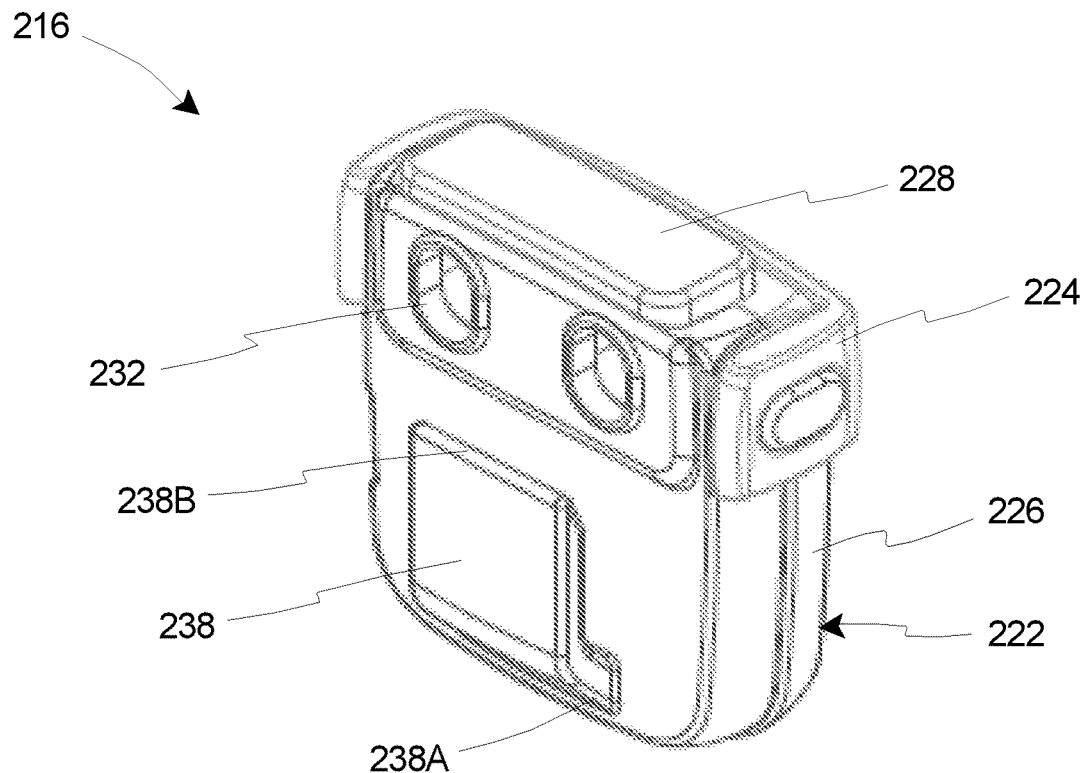
FIG. 2C is a rear perspective view of the lace adjuster illustrated in FIG. 2A, the lace adjuster again being shown in the unlocked configuration.
Figure 2D:
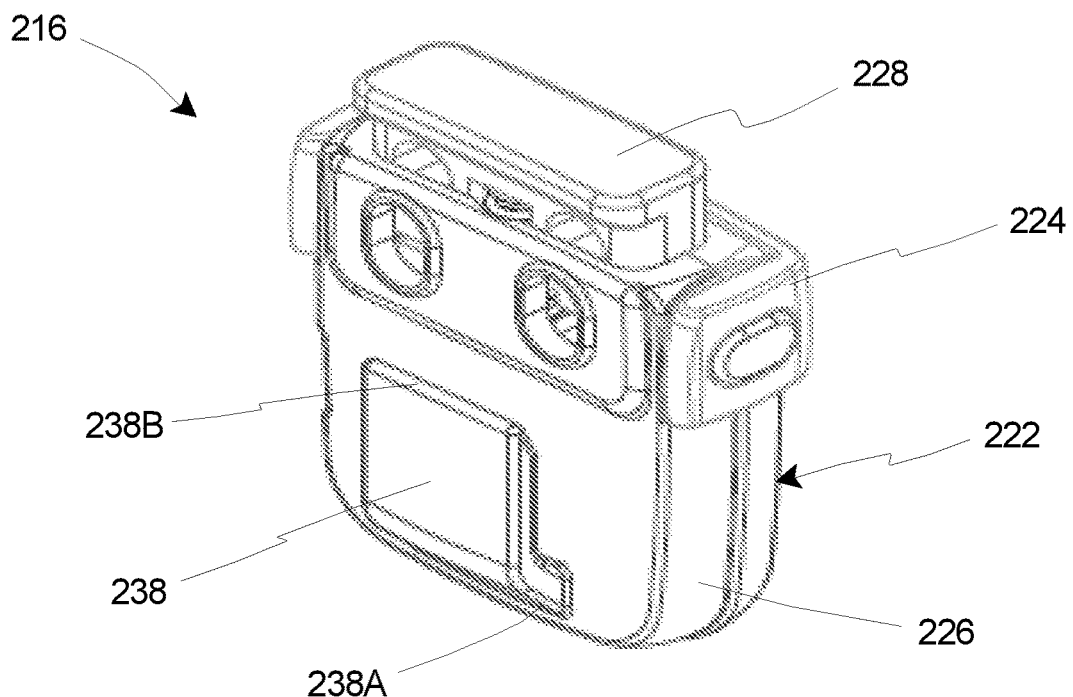
FIG. 2D is a rear perspective view of the lace adjuster illustrated in FIG. 2A, the lace adjuster again being shown in the locked configuration.

Additionally, FIG. 2C is a rear perspective view of the lace adjuster 216 illustrated in FIG. 2A, the lace adjuster 216 again being shown in the unlocked configuration; and FIG. 2D is a rear perspective view of the lace adjuster 216 illustrated in FIG. 2A, the lace adjuster 216 again being shown in the locked configuration.

Looking at FIGS. 2A-2D together, the first body member 226 includes one or more front apertures 230 (two are illustrated, for example, in FIG. 2A) and one or more rear apertures 232 (two are illustrated, for example, in FIG. 2C), and the second body member 228 includes second apertures 234 (two are illustrated more clearly, for example, in FIG. 2B).

When the lace adjuster 216 is in the process of being coupled to the shoelace 14, the adjuster body 222 and/or the body members 226, 228 are positioned in the unlocked configuration. When in the unlocked configuration, as shown in FIGS. 2A and 2B, the front apertures 230 and the rear apertures 232 of the first body member 226 are substantially aligned with and concentric with the second apertures 234 of the second body member 228. With such design, the first lace end 18 can be positioned to extend through one of the front apertures 230 of the first body member 226, through one of the second apertures 234 of the second body member 228, and through one of the rear apertures 232 of the first body member 226. Similarly, the second lace end 20 can also be positioned to extend through one of the front apertures 230 of the first body member 226, through one of the second apertures 234 of the second body member 228, and through one of the rear apertures 232 of the first body member 226.

Subsequently, when in the locked configuration, as shown in FIGS. 2C and 2D, the second body member 228 extends somewhat away from the first body member 226, and the front apertures 230 and the rear apertures 232 of the first body member 226 are not substantially aligned with or concentric with the second apertures 234 of the second body member 228. Thus, when in the locked configuration, the first lace end 18 (illustrated in FIG. 2B) and the second lace end 20 (illustrated in FIG. 2B) of the shoe lace 14 (illustrated in FIG. 2B) can be effectively retained within the lace adjuster 216, i.e. such that the first lace end 18 and the second lace end 20 of the shoelace 14 are inhibited from moving relative to the adjuster body 222.

As shown in this embodiment, it is appreciated that the second body member 228 fits partly within and moves up and down (i.e. when the lace adjuster 216 is oriented vertically) relative to the first body member 226 in a plunger-like manner as the adjuster body 222 is moved between the locked configuration and the unlocked configuration. Stated in another manner, in such embodiment, the first body member 226 is open along a top and into an upper portion 226U of the first body member 226 and, as such, is designed to receive at least a portion of the second body member 228 within such open upper portion 226U and to allow the second body member 228 to move up and down over a movement range relative to and/or at least partially within the first body member 226, i.e. such that the first body member 226 and the second body member 228 and/or the adjuster body 222 as a whole can move between the locked configuration and the unlocked configuration.

Additionally, it should be appreciated that the shape of the front apertures 230, the rear apertures 232, and the second apertures 234 can be varied as desired. For example, in some embodiments, the front apertures 230, the rear apertures 232, and/or the second apertures 234 can include one or more tooth-shaped projections 235 (see, for example, in FIG. 2F) that can be utilized to more effectively retain the shoelace 14 when the lace adjuster 216 is in the locked configuration. Alternatively, the front apertures 230, the rear apertures 232, and/or the second apertures 234 can have another suitable design.

As noted above, the lace end retainer 224 is coupled to the adjuster body 222. Additionally, as provided herein, the lace end retainer 224 is specifically configured to inhibit the first lace end 18 and/or the second lace end 20 from being a potential tripping hazard by inhibiting the first lace end 18 and/or the second lace end 20 from being moved relative to the lace end retainer 224 and the adjuster body 222 when retained by the lace end retainer by a force generated by a contact pressure of the lace end retainer 224 against a surface 222A of the adjuster body 222.

The lace end retainer 224 can have any suitable design and can be coupled to the adjuster body 222 in any suitable manner. For example, in certain embodiments, as shown in FIGS. 2A and 2B, the lace end retainer 224 can include a retainer body 224A and a retainer aperture 224B that extends through the retainer body 224A. Further, as illustrated, the lace end retainer 224 can be positioned such that the retainer aperture 224B is substantially aligned with the front apertures 330 and the rear apertures 332 formed in the first body member 226 of the adjuster body 222 (and also substantially aligned with the second apertures 234 of the second body member 228 when the adjuster body 222 is in the unlocked configuration). With such design, when the first lace end 18 and/or the second lace end 20 of the shoelace 14 are positioned to extend through the front apertures 230, the second apertures 234 and the rear apertures 232, the lace ends 18, 20 could also easily extend through the retainer aperture 224B. Moreover, when it is desired to effectively retain the first lace end 18 and/or the second lace end 20 with the lace end retainer 224, the first lace end 18 and/or the second lace end 20 can be positioned back through the retainer aperture 224B before being retained, e.g., pinched, between the retainer body 224A and the surface 222A of the adjuster body 222.

Additionally, as shown in this embodiment, the lace end retainer 224 can further include at least one first coupling member 224C (also illustrated more clearly in FIGS. 2F and 2G), e.g., a coupling aperture that extends through retainer body 224A, with each of the at least one first coupling member 224C being configured to engage a second coupling member 236 (also illustrated more clearly in FIGS. 2F and 2G) of the adjuster body 222, e.g., a coupling projection that extends away from the adjuster body 222. In one embodiment, the lace end retainer 224 can be configured to extend partially about the adjuster body 222 when the lace end retainer 224 is coupled to the adjuster body 222. In such embodiment, the retainer body 224A can include two coupling apertures 224C, with each of the two coupling apertures 224C being positioned about a different second coupling member 236 that extends or projects away from the adjuster body 222. Alternatively, in another such embodiment, the lace end retainer 224 can be configured to extend fully about the adjuster body 222 when the lace end retainer 224 is coupled to the adjuster body 222. In such alternative embodiment, the retainer body 224A can include two coupling apertures 224C, with each of the two coupling apertures 224C being positioned about a single second coupling member 236 that extends or projects away from the adjuster body 222. Still alternatively, in still another such embodiment, the lace end retainer 224 can be configured to extend fully about the adjuster body 222 with a general loop-type design, such that the retainer body 224A does not need any coupling apertures 224C and there are no coupling members that extend or project away from the adjuster body 222. Yet alternatively, the lace end retainer 224 can be coupled to the adjuster body 222 in another suitable manner.

Further, as noted above, in certain alternative embodiments, the lace end retainer 224 can be removably coupled to the adjuster body 222, or the lace end retainer 224 can be fixedly coupled to the adjuster body 222.

Still further, as above, the lace end retainer 224 can be formed from any suitable materials. For example, in some embodiments, the lace end retainer 224 can be formed from a resilient material, e.g., rubber or another suitable elastic or resilient material. In such embodiments, the lace end retainer 224 can be stretched at least slightly when the lace end retainer 224 is coupled to the adjuster body 222. With such design, based on the resilient nature of the lace end retainer 224, the lace end retainer 224 is better able to exert a force onto the surface 222A of the adjuster body 222 based on a contact pressure between the lace end retainer 224 and the surface 222A of the adjuster body 222. Alternatively, the lace end retainer 224 can be formed from another suitable material.

Referring now to FIGS. 2C and 2D, as shown, the lace adjuster 216 can further include a motion restrictor 238 that is coupled to and cantilevers away from the adjuster body 222. In particular, in this embodiment, the motion restrictor 238 includes a first restrictor end 238A that is secured to the first body member 226 and a second restrictor end 238B that is spaced apart from and/or is not directly secured to the first body member 226. With the design illustrated in the Figures, the motion restrictor 238 is designed similar to a spring-type clip, which is configured to extend underneath at least a portion of the shoelace 14 (illustrated in FIG. 2B) so that at least a portion of the motion restrictor 238 is positioned substantially directly between the shoelace 14 and the shoe body 12 (illustrated in FIG. 1) of the shoe 10 (illustrated in FIG. 1). Thus, the lace adjuster 216 is inhibited from bouncing around and is held more firmly in position when coupled to the shoelace 14 and when the user is engaging in various types of activities.

Figure 2E:
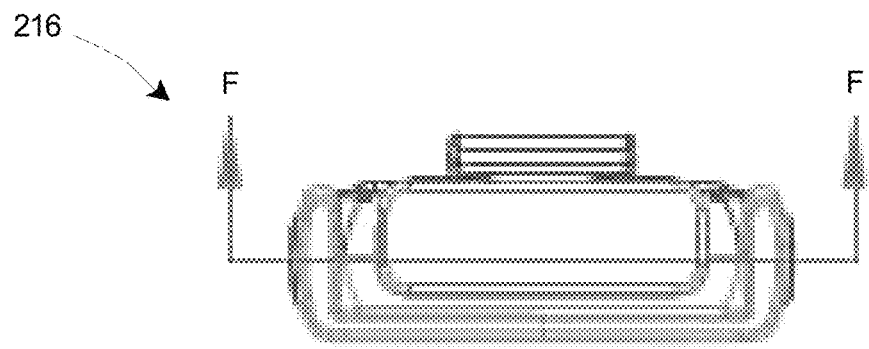
FIG. 2E is a top view of the lace adjuster illustrated in FIG. 2A.
Figure 2F:
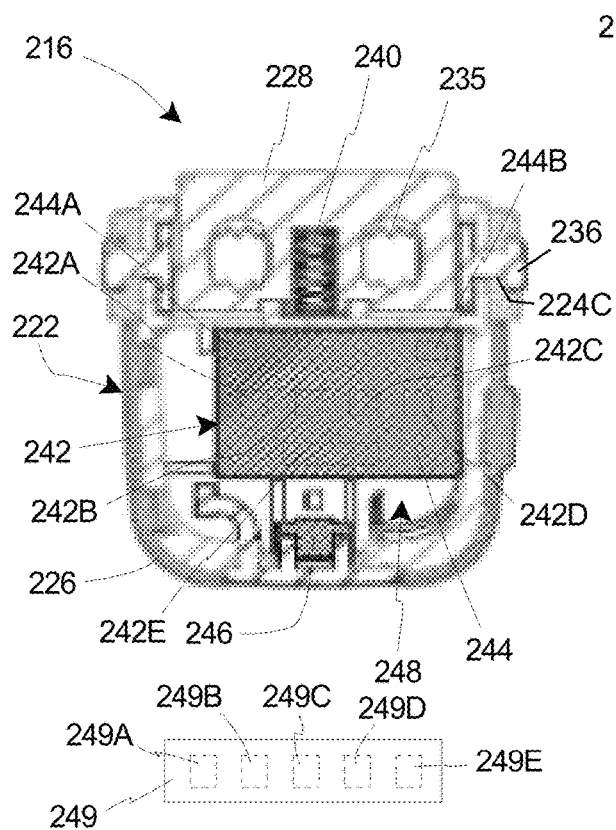
FIG. 2F is a cutaway view of the lace adjuster taken on line F-F in FIG. 2E, the lace adjuster being shown in the unlocked configuration.
Figure 2G:
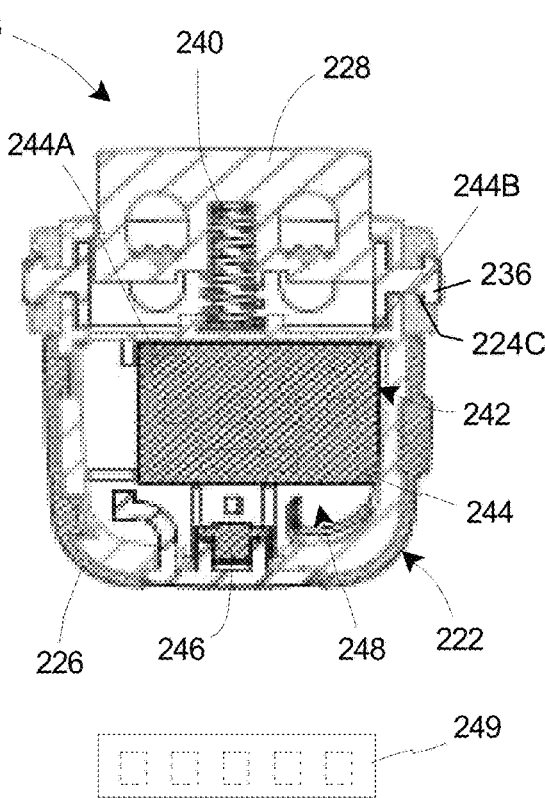
FIG. 2G is a sectional view of the lace adjuster illustrated in FIG. 2A, the lace adjuster being shown in the locked configuration.

FIG. 2E is a top view of the lace adjuster 216 illustrated in FIG. 2A. Additionally, FIG. 2F is a cutaway view of the lace adjuster 216 taken on line F-F in FIG. 2E, the lace adjuster 216 being shown in the unlocked configuration; and FIG. 2G is a comparable sectional view of the lace adjuster 216 illustrated in FIG. 2A, the lace adjuster 216 being shown in the locked configuration. As shown, FIGS. 2E-2G illustrate certain additional features or components that can be included in certain embodiments of the lace adjuster 216.

For example, FIGS. 2F and 2G illustrate certain additional aspects of the movement of the lace adjuster 216, i.e. the relative movement of the first body member 226 and the second body member 228 of the adjuster body 222, between the unlocked configuration and the locked configuration. More specifically, as illustrated, the first body member 226 and the second body member 228 are resiliently coupled to one another with one or more resilient members 240 (only one is illustrated in this example). In particular, the resilient member 240 is connected to and extends between the first body member 226 and the second body member 228 to enable the adjuster body 222 to resiliently move between the unlocked configuration and the locked configuration. It is appreciated that the resilient member 240 can be connected to each of the first body member 226 and the second body member 228 in any suitable manner. For example, in one non-exclusive embodiment, each of the first body member 226 and the second body member 228 can include a member receiver (not shown) that is adapted to receive and retain a portion of the resilient member 240 in order to secure the resilient member 240 to the first body member 226 and the second body member 228, respectively. Alternatively, the resilient member 240 can be connected to the first body member 226 and/or the second body member 228 in another suitable manner.

The design of the resilient member 240 can be varied depending on the requirements of the lace adjuster 216. For example, in the embodiment illustrated in FIGS. 2F and 2G, the resilient member 240 is a spring. In one embodiment, the resilient member 240 is a stiff spring that can hold the first body member 226 and the second body member 228 substantially straight relative to one another to ease the movement of the body members 226, 228 between the locked configuration and the unlocked configuration. Alternatively, the resilient member 240 can be another piece of resilient material. In this embodiment, the resilient member 240 urges the second body member 228 up and/or away relative to the first body member 226 so that the adjuster body 222 is urged and/or biased toward the locked configuration. Alternatively, the resilient member 240 can be designed to urge the second body member 228 within the first body member 226 so that the adjuster body 222 is urged and/or biased toward the unlocked configuration. In such alternative embodiment, the lace adjuster 216 would further require a locking mechanism (not illustrated) that would maintain the first body member 226 and the second body member 228 in the locked configuration. In these alternative embodiments, the resilient member 240 is either extended or compressed as the first body member 226 and the second body member 228 are moved between the locked configuration and the unlocked configuration. Still alternatively, in one embodiment, the lace adjuster 216 can further include a stop (not shown) that inhibits and/or stops relative movement between the body members 226, 228 so that the body members 226, 228 are inhibited from moving beyond the desired positioning for the body members 226, 228 when in the locked configuration and the unlocked configuration. It is appreciated that in such embodiments the stop can be positioned in different manners depending on in which direction the resilient member 240 is biased.

Additionally, in certain embodiments, the lace adjuster 216 can further include a guide system (not shown) that guides relative movement between the first body member 226 and the second body member 228 as the adjuster body 222 is moved between the unlocked configuration and the locked configuration. In such embodiments, the guide system can have any suitable design that enables controlled relative movement between the first body member 226 and the second body member 228 as the adjuster body 222 is moved between the unlocked configuration and the locked configuration. Alternatively, in other embodiments, the lace adjuster 216 can be designed without a specific guide system. In some such alternative embodiments, as noted above, the relative movement between the body members 226, 228 can be guided through use of the stiff spring as the resilient member 240.

Further, as shown in FIGS. 2F and 2G, the lace adjuster 216 can further include a feedback assembly 242, e.g., including a sensor assembly 244 and/or an image capturing assembly 246, that is coupled to the adjuster body 222. In particular, in this embodiment, the feedback assembly 242 is positioned substantially within a body cavity 248 that is formed within the adjuster body 222. In some embodiments, the body cavity 248 can be provided in the form of a sealed and/or water-resistant chamber that can be utilized to provide greater protection from the surrounding environment for the feedback assembly 242.

In certain embodiments, the body cavity 248 can be formed, at least in part, within and/or adjacent to the first body member 226. Alternatively, in other embodiments, the body cavity 248 can be formed, at least in part, between the first body member 226 and the second body member 228 of the adjuster body 222. Still alternatively, the feedback assembly 242 can be positioned on, coupled to and/or incorporated within the lace adjuster 216 in another suitable manner.

Still further, in some embodiments, the adjuster body 222 can further include a separator 229, e.g., a separation wall, that can be used to isolate the body cavity 248, within which the feedback assembly 242 is retained, from the open upper portion 226U of the first body member 226, within which the second body member 228 moves during movement between the unlocked configuration and the locked configuration. With such design, the feedback assembly 242 is again able to be better protected from the surrounding environment.

As described herein, the feedback assembly 242 is usable by the user to provide statistical data and/or images of the user, e.g., during an athletic performance, in order to effectively gauge various aspects of their athletic performance.

As noted above, the lace adjuster 216 that includes such a feedback assembly 242 can be designed such as is illustrated and described in U.S. Pat. No. 10,595,581 B2 issued on Mar. 24, 2020, and entitled "LACE ADJUSTER ASSEMBLY INCLUDING FEEDBACK ASSEMBLY FOR USE IN VISUALIZING AND MEASURING ATHLETIC PERFORMANCE", which has, to the extent allowable, been incorporated herein in its entirety. More specifically, in some embodiments, the feedback assembly 242 can be substantially similar in design and function to the feedback assembly that is incorporated within the lace adjuster illustrated and described in U.S. Pat. No. 10,595,581 B2.

In some embodiments, the sensor assembly 244 can be uniquely designed to sense various performance characteristics, which can be subsequently utilized to provide an athlete or user who is using the sensor assembly 244, i.e. in conjunction with the lace adjuster 216, with statistical data and/or performance measurables that enable the athlete to effectively gauge various aspects of their athletic performance. In certain such embodiments, the sensor assembly 244 can include one or more sensors 244A that can be effectively utilized to sense various performance characteristics of the user, which can be subsequently utilized to generate usable statistical data and/or performance measurables for the user. For example, in certain embodiments, the one or more sensors 244A can include one or more two-axis accelerometers, a three-axis accelerometer, a gyrometer (or gyroscope) and/or another type of rate sensor, and/or a magnetometer. Additionally and/or alternatively, the one or more sensors 244A can include additional appropriate sensor types.

In different embodiments, the sensor assembly 244 can provide statistical data that relates to substantially horizontal movements of the athlete, substantially vertical movements of the athlete, angular and/or rotational movements of the athlete, and/or energy and force expenditures by the athlete during the performance of an athletic activity. For example, in certain embodiments, the sensor assembly 244 can provide the athlete with statistical data related to number of steps taken, total distance traveled, distance traveled per step (i.e. stride length), speed of travel, horizontal burst (i.e. sudden acceleration from an average rate of speed), number of jumps, height of jumps, vertical burst (e.g., take-off velocity or acceleration for a jump), number of accelerations (relating to horizontal burst and/or vertical burst), angular, twisting, pivoting or rotational movements of the athlete (and/or the speed of such movements), energy expended during athletic performance (e.g., in kcal), and/or force expended during athletic performance (e.g., in psi, kpi, or other force measurements). Additionally, the sensor assembly 244 can further provide the athlete with other desired statistical data. Further, the statistical data that is provided by the sensor assembly 244 can be subsequently utilized by the athlete to tailor their training programs and schedules with the goal of ultimately improving their athletic performance. Moreover, the athlete can further compare the statistical data gathered during different and/or subsequent athletic performances to better evaluate any changes of performance measurables.

It is appreciated that any and all of the performance characteristics measured and/or sensed by the one or more sensors 244A can be combined in any suitable manner to enable the generation of various statistical data and/or performance measurables for the athlete during the performance of an athletic activity or event. Additionally, it is further appreciated that in order to more effectively evaluate the various statistical data from the athletic performances, the athlete may desire to provide certain input information, such as the height and weight of the athlete. In one embodiment, the athlete may manually input such information as height and weight into the sensor assembly 244 via a remote device 249 (illustrated as a box that is not to scale), such as a smartphone, a smart watch, a tablet, a computer, and/or any other suitable computing device. Alternatively, information such as the height and weight of the athlete can be provided to the sensor assembly 244 in another suitable manner. This information can further be utilized to see the effects of people's height and weight on the performance data. Additionally, it is appreciated that any statistical data related to energy expended and/or force expended can require information such as the weight of the athlete in order for such statistical data to be accurately generated.

Further, in certain embodiments or applications, the sensor assembly 244 can additionally and/or alternatively include one or more locational sensors 244B, e.g., GPS sensors, for providing accurate and precise locational information that can be used by the individual wearing the lace adjuster 216. For example, in certain non-exclusive alternative applications, the GPS sensors 244B can be utilized for purposes of navigation and/or the GPS sensors 244B can be utilized for purposes of tracking movements of the user. With such applications, the individual wearing the lace adjuster 216 always knows where he or she is, as well as where he or she needs to go to reach any desired destination. In such uses, the GPS sensors 244B can be utilized to inhibit the person wearing the lace adjuster 216 from getting lost and/or to enable the wearer to follow a prescribed trail, e.g., during an adventure race or when exploring the wilderness. Moreover, the GPS sensors 244B can offer a sense of security for someone, e.g., a parent or guardian, who is charged with care for and/or monitoring of the individual wearing the lace adjuster 216. In such applications, the locational information from the GPS sensors 244B can be wirelessly transmitted to the remote device 249 so that the user and/or the parent or guardian can always have the accurate and precise locational information of the person wearing the lace adjuster 216. Further, the GPS sensors 244B can be used to track the movement of the user. For example, the route ran or biked can be recorded and stored for future analysis. Other information, such as time and altitude can also be recorded and stored for future analysis.

Moreover, as described herein below, in some applications, the GPS sensors 244B can be utilized in conjunction with additional GPS sensors or beacons that are positioned remotely from the lace adjuster 216, e.g., that are positioned on or near an athletic field or court, to more precisely and accurately provide locational information for the user.

The image capturing assembly 246, such as a digital camera in some embodiments, can be configured and/or positioned to provide the user with unique viewpoints from which the user is able to visualize and/or evaluate various aspects of their athletic performance. For example, in different embodiments, depending upon the specific positioning and orientation of the image capturing assembly 246 during use, the user is able to effectively capture, review and analyze images (e.g., still images and/or video images) of themselves demonstrating unique perspectives and angles of their athletic performance. For example, the image capturing assembly 246 can provide low resolution or high resolution images or video (and sound). The images or video can be transmitted via Wi-Fi, Bluetooth, or a USB port. In certain embodiments, the images or video can be transmitted for a TV broadcast during a performance or game. The image capturing assembly 246 can be controlled by a button on the lace adjuster 216 or it can be remotely controlled.

In certain embodiments, the image capturing assembly 246 can be directed in a generally upward or outward direction from the shoe 10 (illustrated in FIG. 1) to capture the desired images or video. With such design, the user may be able to gather unique insights into their athletic performance, which would not otherwise be available from remote positioning of an image capturing assembly. Alternatively, the image capturing assembly 246 can be directed in a different direction. In certain embodiments, the direction of where the image capturing assembly 246 is directed can be controlled and/or adjusted by the user, and/or can be controlled remotely by another individual.

Additionally, in some embodiments, the adjuster body 222 can include an imaging aperture 250 (illustrated in FIG. 2A) through which the image capturing assembly 246 is able to capture images of the user during use.

It is appreciated that through use of the motion restrictor 238, which inhibits the lace adjuster 216 from bouncing around during use, the feedback assembly 242 is able to provide more precise, accurate and clear sensed information from the sensor assembly 244 and images from the image capturing assembly 246.

Moreover, it is appreciated that any information from the feedback assembly 242, i.e. from the sensor assembly 244 and/or the image capturing assembly 246, can be downloaded or transmitted into the remote device 249 in any suitable manner. For example, in certain embodiments, the information from the feedback assembly 242, i.e. from the sensor assembly 244 and/or the image capturing assembly 246, can be downloaded or transmitted into the remote device 249 via Bluetooth, Wi-Fi, or another suitable connection. It is further appreciated that any such information from the feedback assembly 242 can be downloaded or transmitted to the remote device 249 wirelessly or via a wired connection. As a non-exclusive example, if the remote device 249 is a smart phone, the remote device 249 can include a receiver 249A (illustrated as a box), a transmitter 249B (illustrated as a box), a controller 249C (illustrated as a box), a storage device 249D (illustrated as a box), and a lace adjuster application 249E (illustrated as a box) that allows the remote device 249 to interact with, receive information from, update, and/or control the lace adjuster 216 remotely. With such capabilities, the user can view any associated data that was generated during the athletic performance from any of the components of the feedback assembly 242.

Further, in certain embodiments, the feedback assembly 242 can also include one or more of a storage device 242A (illustrated as a box in phantom, and which is used for storing the data sensed and/or captured by the feedback assembly 242), a transmitter 242B (illustrated as a box in phantom, and which is used for transmitting the data sensed and/or captured by the feedback assembly 242 to the remote device 249), a receiver 242C (illustrated as a box in phantom, and which is used for receiving data), and a controller 242D (illustrated as a box in phantom, and which is used for processing the data sensed and/or captured by the feedback assembly 242). For example, in some embodiments, the controller 242D can include one or more program algorithms that can be effectively utilized to convert the performance characteristics as measured and/or sensed by the one or more sensors 244A into usable statistical data for the athlete. The controller 242D can include one or more circuits and/or processors. The program algorithms can be varied depending on the particular statistical data that is desired. In some embodiments, the controller 242D can be alternatively or additionally included within the remote device 249.

In some embodiments, a separate storage device, transmitter and controller can be included for and/or within each of the sensor assembly 244 and the image capturing assembly 246. Alternatively, in other embodiments, a common storage device, transmitter and controller can be included for both of the sensor assembly 244 and the image capturing assembly 246.

Additionally, a power source 242E (illustrated as a box in phantom) can be included to provide necessary power for both the sensor assembly 244 and the image capturing assembly 246 of the feedback assembly 242; or a separate power source can be included for each of the sensor assembly 244 and the image capturing assembly 246 of the feedback assembly 242. For example, the power source 242E can include one or more batteries. In a specific example, the one or more batteries can be selectively recharged via a connector port 252 (illustrated in FIG. 2I). Additionally, or in the alternative, the connector port 252 can be used for other suitable purposes. For example, in some alternative embodiments, the connector port 252 can also be utilized for purposes of transmitting information from the lace adjuster 216 to the remote device 249. Still alternatively, in some embodiments, the power source 242E can be charged remotely.

Figure 2H:
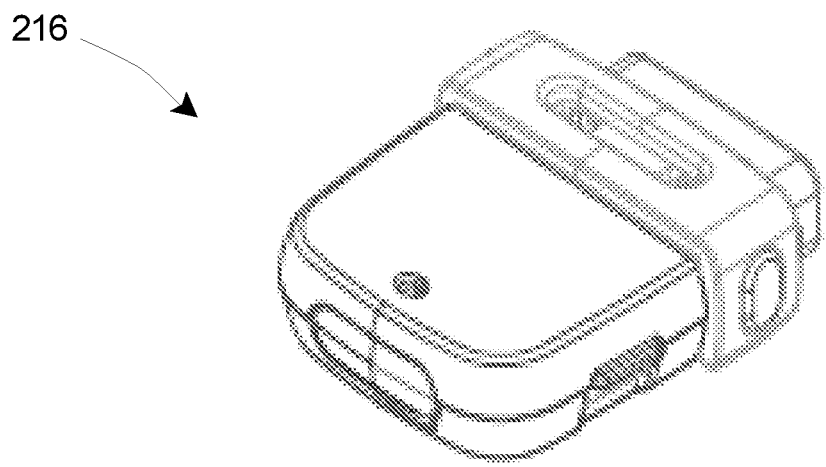
FIG. 2H is a front perspective view of the lace adjuster illustrated in FIG. 2A.

FIG. 2H is a front perspective view of the lace adjuster 216 illustrated in FIG. 2A.

Figure 2I:
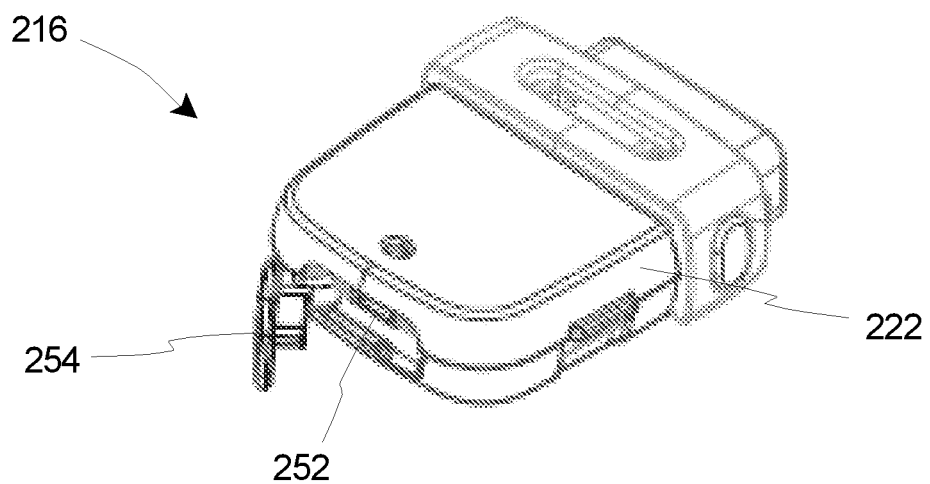
FIG. 2I is another front perspective view of the lace adjuster illustrated in FIG. 2A.

FIG. 2I is another front perspective view of the lace adjuster 216 illustrated in FIG. 2A. As shown in FIG. 2I, the lace adjuster 216 includes a port cover 254 that is coupled to the adjuster body 222, and that can be selectively opened to reveal the connector port 252 that is usable for charging the power source 242E (illustrated, for example, in FIG. 2F), or for transmitting information from the feedback assembly 242 (illustrated, for example, in FIG. 2F) to the remote device 249 (illustrated, for example, in FIG. 2F), such as a smartphone, a smart watch, a tablet, a computer, and/or any other suitable computing device.

Figure 2J:
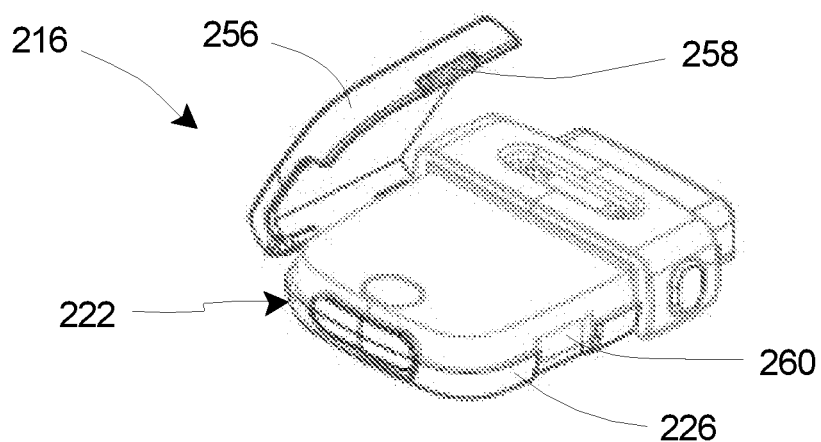
FIG. 2J is still another front perspective view of the lace adjuster illustrated in FIG. 2A.

FIG. 2J is still another front perspective view of the lace adjuster 216 illustrated in FIG. 2A. As shown, FIG. 2J illustrates an additional feature of the lace adjuster 216, i.e. the selective coupling of an adjuster cover plate 256 to the first body member 226 so as to form a portion of the adjuster body 222. In some embodiments, the adjuster cover plate 256 can include a design so as to give the lace adjuster 216 a more interesting appearance. Additionally, in various embodiments, the adjuster cover plate 256 can be interchangeable with other alternative adjuster cover plates so that the lace adjuster 216 can have any desired design as included within the adjuster cover plate 256.

It is appreciated that the adjuster cover plate 256 can be selectively attached to and detached from the first body member 226 and/or the adjuster body 222 in any suitable manner. For example, in certain embodiments, the adjuster cover plate 256 can include a first attachment member 258 that is configured to selectively engage a second attachment member 260 that is coupled to and/or included within the first body member 226 or another portion of the adjuster body 222. In one such embodiment, the first attachment member 258 can include a hook-type element that is configured to engage a groove-type element of the second attachment member 260. Alternatively, the first attachment member 258 can include a groove-type member that is configured to be engaged by a hook-type member of the second attachment member 260. Still alternatively, the first attachment member 258 and/or the second attachment member 260 can have another suitable design.

It is appreciated that in various embodiments, the adjuster cover plate 256 can include two first attachment members 258 and the first body member 226 (or other portion of the adjuster body 222) can include two second attachment members 260 so that the adjuster cover plate 256 is selectively attachable to the first body member 226 and/or the adjuster body 222 on two spaced apart locations, e.g., on opposing sides of the adjuster body 222. Additionally, it is further appreciated that the adjuster cover plate 256 can be attached to the adjuster body 222, e.g., to the first body member 226, at more than one place on each side of the adjuster body 222. For example, in one such alternative embodiment, the adjuster cover plate 256 can be attached to the first body member 226 at one place on one side of the adjuster body 222, and the adjuster cover plate 256 can be attached to the first body member 226 at two spaced apart places on the other side of the adjuster body 222.

Yet alternatively, the adjuster cover plate 256 can be hingedly coupled to the adjuster body 222 on one side of the adjuster cover plate 256. With such design, the adjuster cover plate 256 can be moved relative to the adjuster body 222, e.g., similar to the opening of a door, to provide access to the feedback assembly 242 (illustrated in FIG. 2F) that is positioned substantially within the body cavity 248 (illustrated in FIG. 2F), and which in certain embodiments can be defined between the first body member 226 and the adjuster cover plate 256. Moreover, in certain embodiments, the feedback assembly 242 can be coupled to, or positioned on and/or substantially adjacent to the adjuster cover plate 256.

Additionally or in the alternative, as noted above, the lace adjuster 216 that includes such interchangeable adjuster cover plates 256 can be designed such as is illustrated and described in U.S. Pat. No. 10,512,304 B2 issued on Dec. 24, 2019, and entitled "LACE ADJUSTER WITH INTERCHANGEABLE COVERS", which has, to the extent allowable, been incorporated herein in its entirety.

Moreover, in certain embodiments, the lace adjuster 216 can further include a light assembly (not shown) including one or more lights (not shown), e.g., LED lights, that can be mounted on and/or positioned substantially adjacent to the adjuster cover plate 256 or another component of the lace adjuster 216. In particular, in some such embodiments, the lights can be coupled to the adjuster cover plate 256 and/or can be positioned such that the lights can shine and/or extend through one or more light apertures (not shown) in the adjuster cover plate 256. Such lights can also be positioned so as to more effectively and dramatically draw attention to the design on the adjuster cover plate 256 and/or to provide desired lighting for someone using the lace adjuster 216 in less favorable lighting situations, e.g., at night. Additionally and/or alternatively, the light assembly, i.e. the lights, can be positioned in a different area of the lace adjuster 216.

Figure 2K:
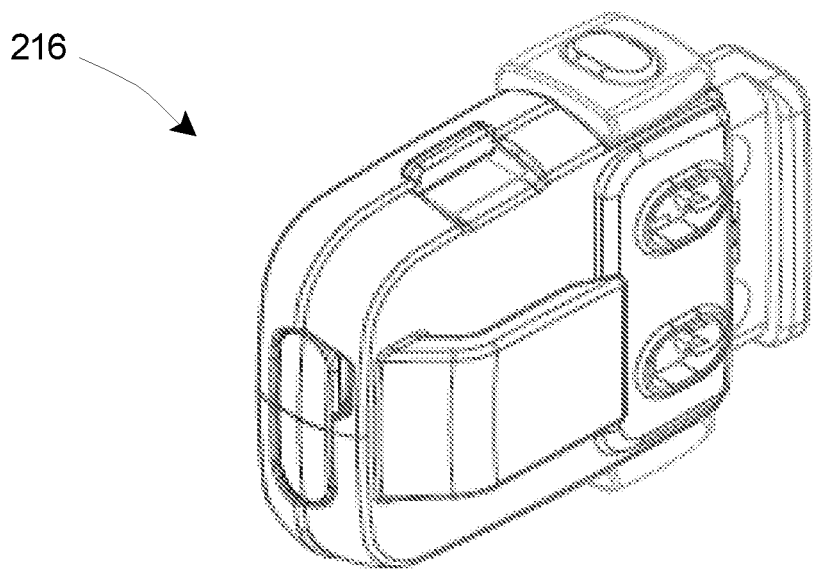
FIG. 2K is a rear perspective view of the lace adjuster illustrated in FIG. 2A.
Figure 2L:
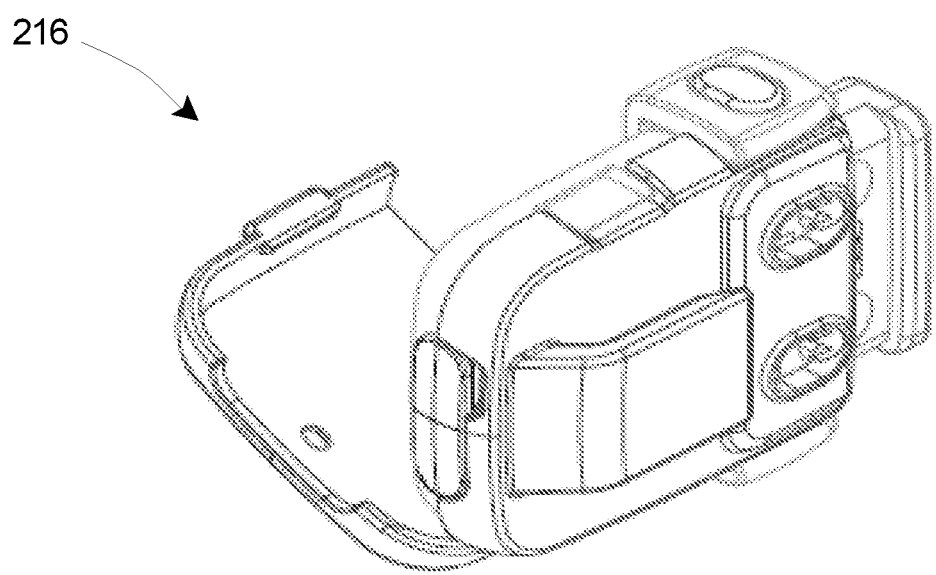
FIG. 2L is another rear perspective view of the lace adjuster illustrated in FIG. 2A.
Figure 2M:
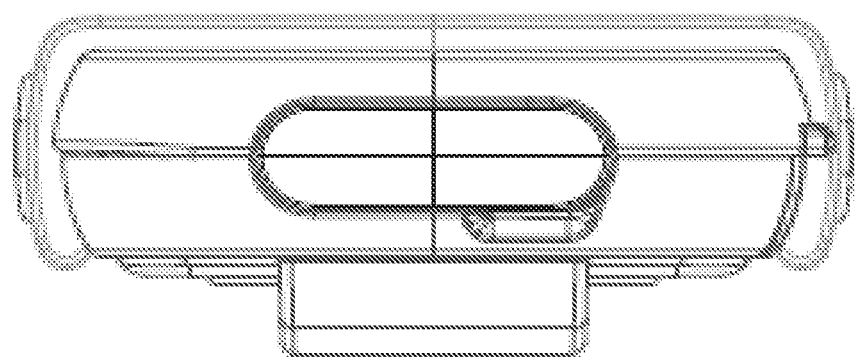
FIG. 2M is a bottom view of the lace adjuster illustrated in FIG. 2A.
Figure 2N:
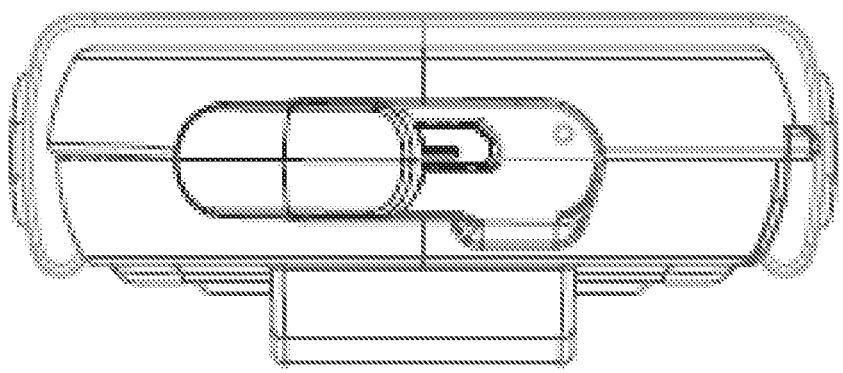
FIG. 2N is another bottom view of the lace adjuster illustrated in FIG. 2A.
Figure 2O:
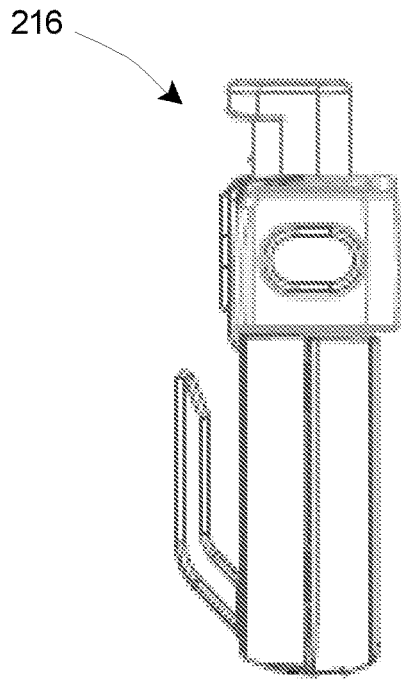
FIG. 2O is a side view of the lace adjuster illustrated in FIG. 2A.
Figure 2P:
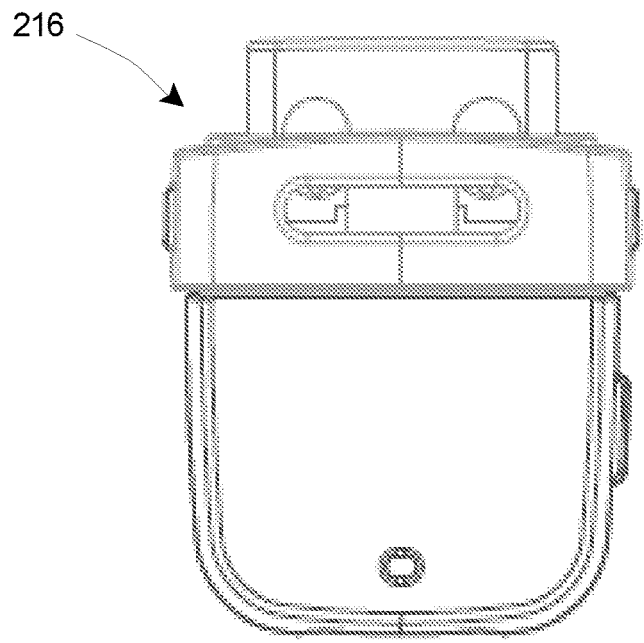
FIG. 2P is a front view of the lace adjuster illustrated in FIG. 2A.
Figure 2Q:
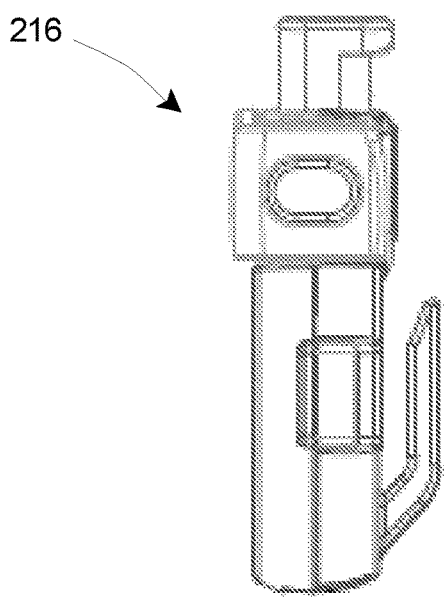
FIG. 2Q is another side view of the lace adjuster illustrated in FIG. 2A.
Figure 2R:
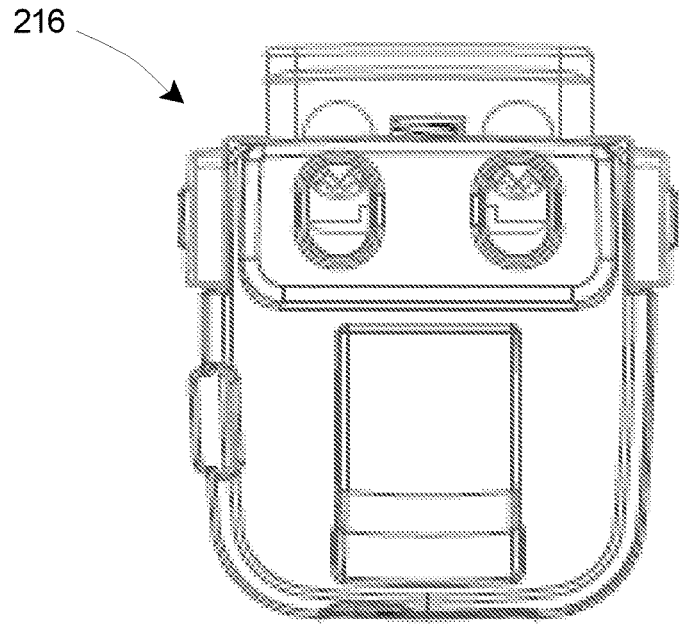
FIG. 2R is a rear view of the lace adjuster illustrated in FIG. 2A.

FIGS. 2K-2R illustrate certain additional views of the lace adjuster 216 illustrated in FIG. 2A, and thus provide different vantage points of various features and components of the lace adjuster 216. In particular, FIG. 2K is a rear perspective view of the lace adjuster 216 illustrated in FIG. 2A; FIG. 2L is another rear perspective view of the lace adjuster 216 illustrated in FIG. 2A; FIG. 2M is a bottom view of the lace adjuster 216 illustrated in FIG. 2A; FIG. 2N is another bottom view of the lace adjuster 216 illustrated in FIG. 2A; FIG. 2O is a side view of the lace adjuster 216 illustrated in FIG. 2A; FIG. 2P is a front view of the lace adjuster 216 illustrated in FIG. 2A; FIG. 2Q is another side view of the lace adjuster 216 illustrated in FIG. 2A; and FIG. 2R is a rear view of the lace adjuster 216 illustrated in FIG. 2A.

Figure 3:
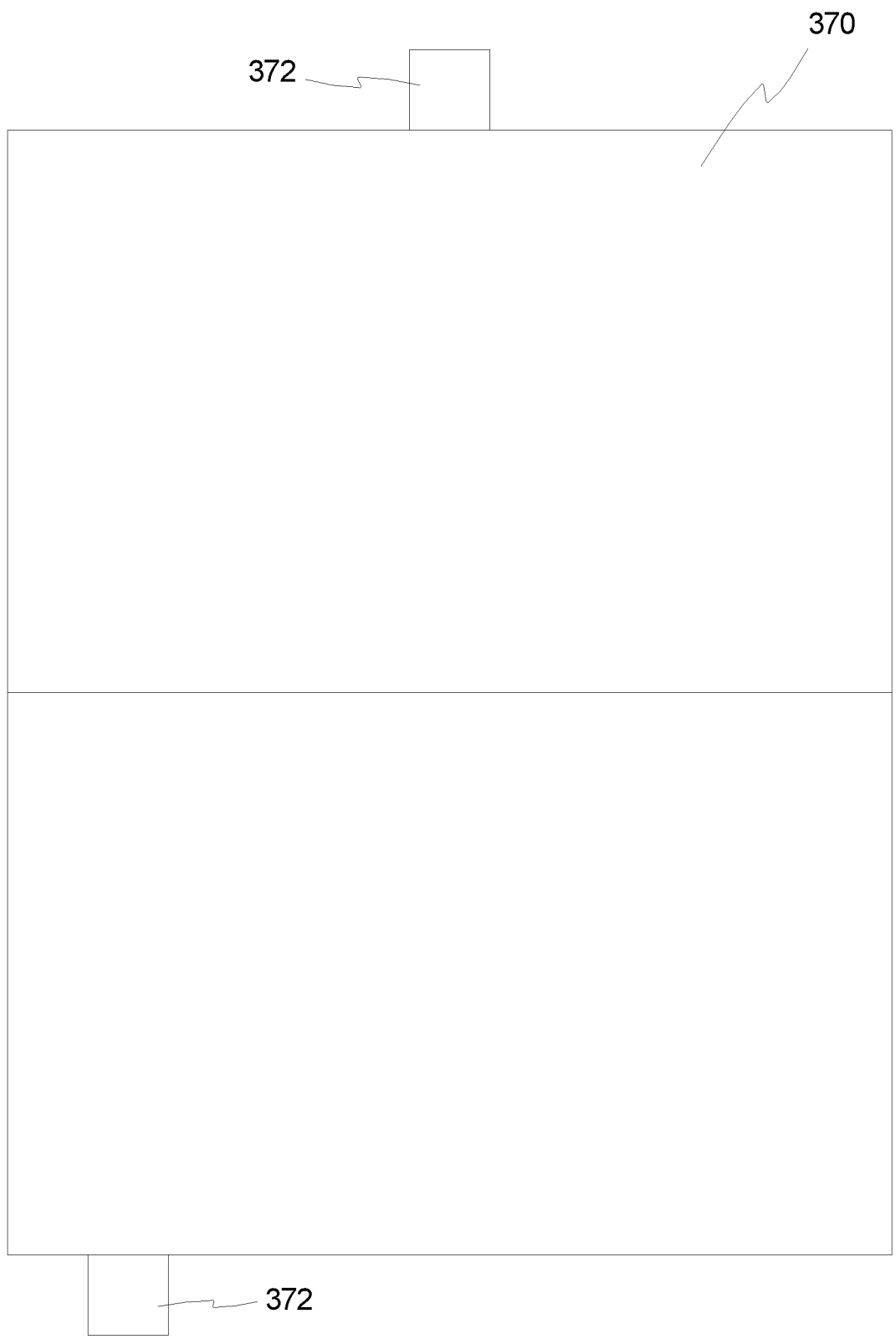
FIG. 3 is a simplified top view of an athletic field that is usable by a user of the lace adjuster.

FIG. 3 is a simplified top view of an area 370 that is usable by a user of the lace adjuster 216 (illustrated in FIG. 2A). As noted above, in some embodiments, the lace adjuster 216 can include a feedback assembly 242 (illustrated in FIG. 2F) that can include a locational sensor such as a GPS sensor within a sensor assembly 244 (illustrated in FIG. 2F) in order to provide locational and/or tracking information for the user. It is appreciated that in order to obtain the most precise and accurate locational and tracking information, it can be desired to include more than one or more additional sensors 372, e.g., two, three, or four sensors, that are spaced apart from one another and positioned near the area 370. In such arrangement, the overall system is better able to determine and track the actual precise location of the lace adjuster 216.

The type of area 370 can vary. For example, the area 370 can be an athletic field such as a football or soccer field; a court such as a tennis or basketball court; or another type of area 370.

In the present design, the user of the lace adjuster 216 can be participating in an event in the area 370, and the one or more sensor 372 can be used to improve the locational information of the lace adjuster 216.

In FIG. 3, the area 370 can include two additional sensors 372. For example, as provided above, the lace adjuster 216 can include a GPS sensor. Further, each additional sensor 372 can include a GPS sensor to determine the location of these additional sensors 372. Further, the GPS information from these sensor(s) 372 can be relayed to the lace adjuster 216 and/or to the remote device 249 to improve the measurement information of the lace adjuster 216. As non-exclusive examples, the lace adjuster 216 can be electrically connected via WI-FI or Bluetooth to the additional sensors 372.

Additionally, or alternatively, the additional sensors 372 can be used to monitor the relative position of the lace adjuster 216 over time. For example, the additional sensors 372 can include one or more systems that monitor the relative position of the lace adjuster 216 over time, or generate signals that can be used by the lace adjuster 216 to monitor position.

Additionally, or alternatively, the additional sensors 372 can generate GPS signals which can be utilized by the lace adjuster 216 to provide more accurate and precise locational and tracking information for the user of the lace adjuster 216. It is appreciated that the sensors 372 can be positioned in any suitable manner relative to the athletic field, e.g., on and/or near the athletic field 370, in order to provide such information for the user. Additionally, as shown, the sensors 372 will typically be provided in fixed positions relative to the athletic field 370. Thus, during use, each of the sensors 372 can provide precise, locational and/or tracking information. The sensors 372 can also be electronically linked to one another and/or can communicate with one another, e.g., wirelessly or with a wired connection.

With this design, each of the sensor(s) 372 can communicate, i.e. wirelessly in any suitable manner, with the locational sensor, e.g., the GPS sensor, within the sensor assembly 244 and/or the feedback assembly 242 as the user moves on or about the athletic field 370. Based on the communications among the sensor(s) 372 and the GPS sensor within the sensor assembly 244 and/or the feedback assembly 242 of the lace adjuster 216 on the shoelace 14 (illustrated in FIG. 1) of the shoe 10 (illustrated in FIG. 1) of the user, precise locational and/or tracking information of the user can be known at all times when the user is using the athletic field 370. In such manner, the user can obtain desired information regarding statistical data, e.g., during an athletic performance, in order to effective gauge various aspects of their athletic performance.

It is understood that although a number of different embodiments of the lace adjuster 16 have been illustrated and described herein, one or more features of any one embodiment can be combined with one or more features of one or more of the other embodiments, provided that such combination satisfies the intent of the present invention.

While a number of exemplary aspects and embodiments of a lace adjuster 16 have been shown and disclosed herein above, those of skill in the art will recognize certain modifications, permutations, additions and sub-combinations thereof. It is therefore intended that the lace adjuster assembly 12 shall be interpreted to include all such modifications, permutations, additions and sub-combinations as are within their true spirit and scope, and no limitations are intended to the details of construction or design herein shown.

What is claimed is:

1. A lace adjuster for selectively adjusting and securing a shoelace of a shoe, the shoelace being coupled to a shoe body of the shoe, the shoelace including a first lace end and a second lace end, the lace adjuster comprising:
    an adjuster body; and
    a lace end retainer that is coupled to the adjuster body, the lace end retainer being configured to receive and retain the first lace end between the lace end retainer and a surface of the adjuster body;
    wherein the lace end retainer is formed from a resilient material that is stretched when coupled to the adjuster body so as to exert a force onto the surface of the adjuster body based on a contact pressure between the lace end retainer and the adjuster body.

2. The lace adjuster of claim 1 wherein the first lace end of the shoelace is inhibited from being moved relative to the lace end retainer and the adjuster body when retained by the lace end retainer by the force generated by the contact pressure of the lace end retainer against the surface of the adjuster body.

3. The lace adjuster of claim 1 wherein the lace end retainer is further configured to receive and retain the second lace end between the lace end retainer and the surface of the adjuster body.

4. The lace adjuster of claim 1 wherein the lace end retainer includes a first coupling member and the adjuster body includes a second coupling member; and wherein the first coupling member engages the second coupling member so that the lace end retainer is coupled to the adjuster body.

5. The lace adjuster of claim 4 wherein the lace end retainer includes a retainer body; wherein the first coupling member is a coupling aperture that extends through the retainer body; wherein the second coupling member is a coupling projection that extends away from the adjuster body; and wherein the coupling aperture is positioned to engage the coupling projection so that the lace end retainer is coupled to the adjuster body.

6. The lace adjuster of claim 1 wherein the lace end retainer is fixedly coupled to the adjuster body.

7. The lace adjuster of claim 1 wherein the lace end retainer is removably coupled to the adjuster body.

8. The lace adjuster of claim 1 wherein the lace end retainer includes a retainer body and a retainer aperture that extends through the retainer body; and wherein the first lace end extends through the retainer aperture before being retained between the lace end retainer and the adjuster body.

9. The lace adjuster of claim 1 further comprising a motion restrictor that is coupled to and cantilevers away from the adjuster body, at least a portion of the motion restrictor being configured to be positioned between the shoelace and the shoe body when the lace adjuster is being used to selectively adjust and secure the shoelace of the shoe.

10. The lace adjuster of claim 1 further comprising a GPS sensor that is coupled to the adjuster body, the GPS sensor being configured to provide locational information of a user of the lace adjuster.

11. A shoe comprising a shoe body and a shoelace that is coupled to the shoe body; and wherein the lace adjuster of claim 1 is selectively coupled to the shoelace.

12. A method for selectively adjusting and securing a shoelace of a shoe, the shoelace being coupled to a shoe body of the shoe, the shoelace including a first lace end and a second lace end, the method comprising the steps of:
coupling a lace end retainer to an adjuster body; and
receiving and retaining the first lace end between the lace end retainer and a surface of the adjuster body;
wherein the step of coupling includes forming the lace end retainer from a resilient material that is stretched when coupled to the adjuster body so as to exert a force onto the surface of the adjuster body based on a contact pressure between the lace end retainer and the adjuster body.

13. The method of claim 12 wherein the step of receiving and retaining includes inhibiting movement of the first lace end of the shoelace relative to the lace end retainer and the adjuster body when retained by the lace end retainer by the force generated by the contact pressure of the lace end retainer against the surface of the adjuster body.

14. The method of claim 12 wherein the step of coupling includes a first coupling member of the lace end retainer engaging a second coupling member of the adjuster body so that the lace end retainer is coupled to the adjuster body.

15. A method for selectively adjusting and securing a shoelace of a shoe, the shoelace being coupled to a shoe body of the shoe, the shoelace including a first lace end and a second lace end, the method comprising the steps of:
coupling a lace end retainer to an adjuster body, a first coupling member of the lace end retainer engaging a second coupling member of the adjuster body so that the lace end retainer is coupled to the adjuster body; and
receiving and retaining the first lace end between the lace end retainer and a surface of the adjuster body;
wherein the step of coupling includes the lace end retainer including a retainer body; wherein the first coupling member is a coupling aperture that extends through the retainer body; wherein the second coupling member is a coupling projection that extends away from the adjuster body; and wherein the coupling aperture is positioned to engage the coupling projection so that the lace end retainer is coupled to the adjuster body.

16. A method of providing a shoe including the steps of coupling a shoelace to a shoe body of the shoe; and selectively adjusting and securing the shoelace utilizing the method of claim 12.

17. A method for providing locational information of a user, the method comprising the steps of providing an athletic field including at least one GPS beacon, the user wearing a shoe provided by the method of claim 16, and wherein the step of selectively adjusting and securing includes coupling a GPS sensor to the adjuster body.

18. The method of claim 12 wherein the step of receiving and retaining includes the lace end retainer including a retainer body and a retainer aperture that extends through the retainer body; and extending the first lace end through the retainer aperture before the first lace end is retained between the lace end retainer and the adjuster body.

19. The method of claim 12 further comprising the steps of coupling a motion restrictor to the adjuster body such that the motion restrictor cantilevers away from the adjuster body; and positioning at least a portion of the motion restrictor between the shoelace and the shoe body when the lace adjuster is being used to selectively adjust and secure the shoelace of the shoe.

\* \* \* \* \*